United States Patent [19]

Ingraham et al.

[11] Patent Number: 4,672,278

[45] Date of Patent: Jun. 9, 1987

[54] ANTENNA RELAY METHOD AND APPARATUS

[75] Inventors: Ronald D. Ingraham, Quincy; Darrel A. Dolph, Big Rapids, both of Mich.

[73] Assignee: Nartron Corporation, Reed City, Mich.

[21] Appl. No.: 914,502

[22] Filed: Oct. 2, 1986

Related U.S. Application Data

[63] Continuation of Ser. No. 785,720, Oct. 9, 1985, abandoned.

[51] Int. Cl.$^4$ .............................................. H02P 1/22
[52] U.S. Cl. ................................... 318/283; 318/266; 318/286; 318/468; 307/10 R
[58] Field of Search ............. 318/264, 265, 266, 282, 318/283, 284, 286, 434, 461, 466, 467, 468, 469, 470; 307/10 R

[56] References Cited

U.S. PATENT DOCUMENTS

| 4,303,872 | 12/1981 | Alf et al. ........................ 318/226 X |
| 4,330,782 | 5/1982 | Hashimoto et al. ............ 318/468 X |
| 4,338,552 | 7/1982 | Pilz et al. ............................ 318/266 |
| 4,347,465 | 8/1982 | Goertler et al. ................ 318/286 X |
| 4,459,521 | 7/1984 | Barge ............................. 318/305 X |
| 4,514,670 | 4/1985 | Fassel et al. .................... 318/266 X |

Primary Examiner—William M. Shoop, Jr.
Assistant Examiner—Bentsu Ro
Attorney, Agent, or Firm—Watts, Hoffmann, Fisher & Heinke

[57] ABSTRACT

An antenna motor drive system for raising and lowering an antenna. Response to a user input for raising or lowering a vehicle antenna is delayed to avoid rapid reversals of the antenna drive motor. This avoids the large surge currents associated with the prior art. The circuit monitors drive circuit response and de-energizes the motor if an inappropriate response is sensed after a certain period. Use of switching transistors rather than a relay facilitates implementation of the invention in integrated circuit form.

8 Claims, 5 Drawing Figures

ANTENNA RELAY METHOD AND APPARATUS

This is a continuation of co-pending application Ser. No. 785,720 filed on Oct. 9, 1985, now abandoned.

DESCRIPTION

TECHNICAL FIELD

The present invention relates to method and apparatus for extending and retracting a motor vehicle antenna.

BACKGROUND ART

Vehicle radio antennas are commonly raised and lowered so that during radio or other communications listening the antenna receives signals and whenever the radio or vehicle ignition is turned off, the antenna is lowered into a vehicle fender well. In the prior art, the raising and lowering of the vehicle antenna is typically accomplished by energizing a relay to open and close relay contacts that energize an antenna drive motor.

The prior art relay contacts are susceptible to damage if the relay is rapidly switched on and off. The mechanical switch of the prior art relay can typically safely experience 10 amperes, but rapid switching on and off of the vehicle radio can produce motor surge currents that burn out the relay. The mean time between failures of such prior art relays is much less than manufacturer specifications due to high surge currents caused by rapid switching on and off of the vehicle radio. Rapid switching is a normal condition that is experienced at start-up, but can produce surge currents of up to 25 amperes.

DISCLOSURE OF THE INVENTION

The method and apparatus of the invention reduces the instance of failure of an antenna drive system. Advantageous antenna motor operation is achieved inexpensively through use of integrated circuits that delay energization of the motor to avoid the surge currents experienced with prior art systems.

The antenna drive system of the invention includes a drive circuit to extend and retract a vehicle antenna coupled to an actuator circuit that controls the status of the drive circuit. The actuator, preferably a switch, can be toggled by the vehicle operator between two states, one for extending, (typically raising) and one for retracting (typically lowering) the antenna. As in the prior art, this is accomplished by turning on and off the radio or turning on and off the ignition with the radio turned on. A delay circuit delays response of the drive circuit to a change of state of the actuator to avoid rapid switching on and off of the drive circuit. The high voltage, high current pulses experienced by prior art systems are avoided.

In accordance with a preferred design, the delay between a change in state of the actuator and drive circuit response is approximately 50 milliseconds. Unless the control input to the circuit remains stable for this period, the power circuit does not respond to changes of state so that rapid toggling on and off of the radio will not place high current loads on the switching mechanism.

Unlike the prior art, the present invention utilizes switching transistors rather than relays to control the status of the antenna motor. By monitoring current through these transistors, the response of the drive circuit to the actuator is sensed. If a particular transistor current is not sensed, the drive circuit is de-energized.

A preferred monitoring circuit includes integrated circuit logic that controls the drive circuit switching transistors. This logic circuit both implements a delay between actuation and response of the system and monitors system response after the delayed actuation.

An additional feature of the invention includes a snap action input circuit coupling the actuator to the system. A delay feature rejects spurious inputs so they do not trigger the motor drive. This delay insures that noise or other spurious signals in the automobile environment do not improperly trigger the raising or lowering of the vehicle antenna.

From the above it is appreciated that one object of the invention is an improved, more reliable drive circuit for raising and lowering a motor vehicle antenna. This and other objects, advantages and features of the invention will become better understood when a detailed description of a preferred embodiment of the invention is described in conjunction with the accompanying drawings.

BEST MODE FOR CARRYING OUT THE INVENTION

Figure 1:
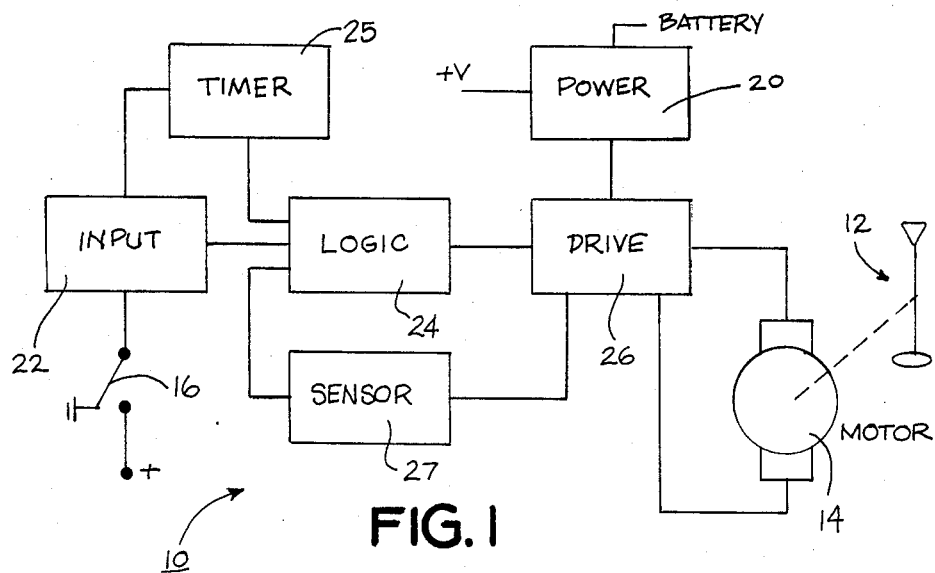
FIG. 1 is an schematic overview of the control system for extending and retracting a vehicle antenna.

Turning now to the drawings, FIG. 1 illustrates a control system 10 for extending and retracting an antenna 12 by controlled energization of a reversible d.c. drive motor 14. By controlling the direction of motor rotation, the antenna can be extended and retracted. The system 10 preferably controls the raising and lowering of a motor vehicle antenna so that the motor 14 is mounted beneath a vehicle fender and a motor output shaft coupled to the antenna extends the antenna above the fender when the vehicle operator turns on the radio.

Motor energization is controlled by a user actuated switch 16. In the preferred use, the switch 16 is coupled to the vehicle radio so that the motor 14 raises the antenna when the radio is turned on and retracts the antenna when the radio is turned off. The system includes a power circuit 20 that generates voltages required by input 22, logic 24, timing 25, drive 26 and sensing 27 circuits included in the control system 10.

The timing circuit 25 introduces a 200 millisecond delay between receipt of a signal from the input circuit 22 and energization of the motor 14. During this delay interval any existing motor drive is turned off and the drive motor 14 comes to a stop before it can be repowered in a reverse direction. This eliminates the high surge currents associated with motor reversals.

The logic circuit 24 also confirms drive circuit operation. If an appropriate motor energization is not sensed within 200 milliseconds after the end of the 200 millisecond delay, the logic circuit disables the motor. The confirmation is accomplished by a sensing circuit 27 that monitors motor drive current and compares this current with reference values indicating proper energization circuit operation.

Figure 2:
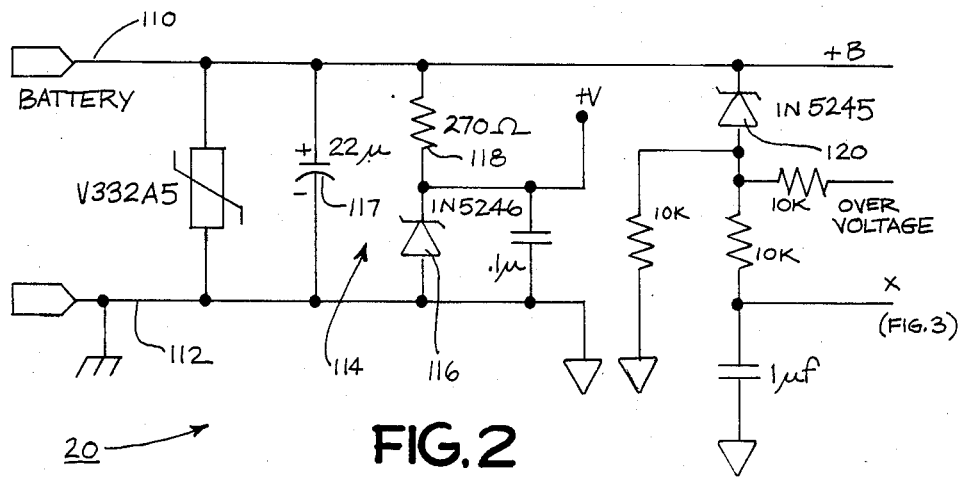
FIG. 2 illustrates a power circuit used for energizing the control system.
Figure 3:
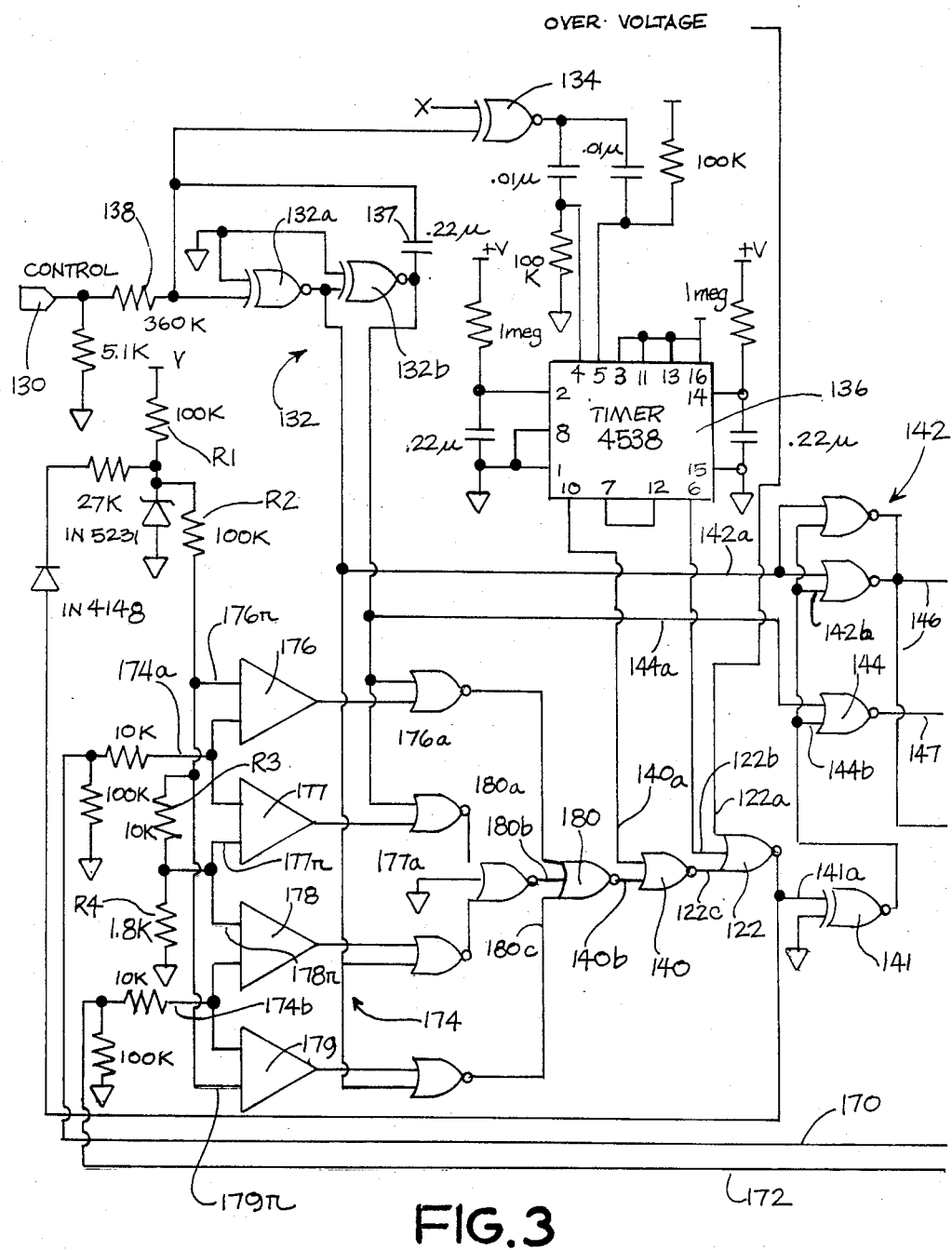
FIG. 3 illustrates a circuit input, timing control circuit, and sensing circuit of the invention.

A system power circuit (FIG. 2) has a battery input 110 and ground connection 112. The battery input 110 is filtered with an input protection circuit 114 having a Zener diode 116 capacitor 117 and resistor 118. A second Zener diode 120 is an over-voltage sensing device which couples an over-voltage condition signal to a NOR gate 122 (FIG. 3) in the logic circuit 24. If the battery input voltage exceeds a threshold voltage, the Zener diode 120 breaks down and an input 122a to the NOR gate 122 goes high. This input deactivates the motor drive circuit.

A control input 130 (FIG. 3) is turned on and off by user actuation of the switch 16 to raise and lower the radio antenna 12. Signals at this input are coupled through a 50 millisecond (approximately) delay circuit 132 to an exclusive NOR gate 134 connected to a timer 136. The delay circuit 132 includes two exclusive NOR gates 132a, 132b. When the input 130 is low, the gate 132a produces a high output and the gate 132b a low output. When the input 130 is high, gate 132a produces a low output and gate 132b a high output.

The combination of a capacitor 137 and resistor 138 introduces the 50 millisecond (approximate) delay in coupling a change in the control input 130 to the gate 134. This delay assures the input is real and not noise or switch contact bounce. As the capacitor charges (or discharges) a threshold voltage is reached at the input to the exclusive NOR gate 132a. This causes a change in this gate's output which switches the gate 132b. A pulse at the output of the second gate 132b is coupled across the capacitor 137 and provides a snap action to the input 130 and a well defined input for the gate 134.

A change of the output from the exclusive NOR gate 134 activates the timer 136 which responds by producing an output pulse at timer pins 10 and 6 respectively. The duration of the pulse from pins 10 and 6 depend upon the value of timing components coupled across pins 2 and 1 and 14 and 15 on the timer 136. In the disclosed embodiment receipt of a positive or negative control input from the gate 134 at pins 4 and 5 of the timer 136 causes pins 6 and 10 to produce consecutive 200 millisecond signals. Pin 6 first produces this signal and then pin 10.

Figure 4:
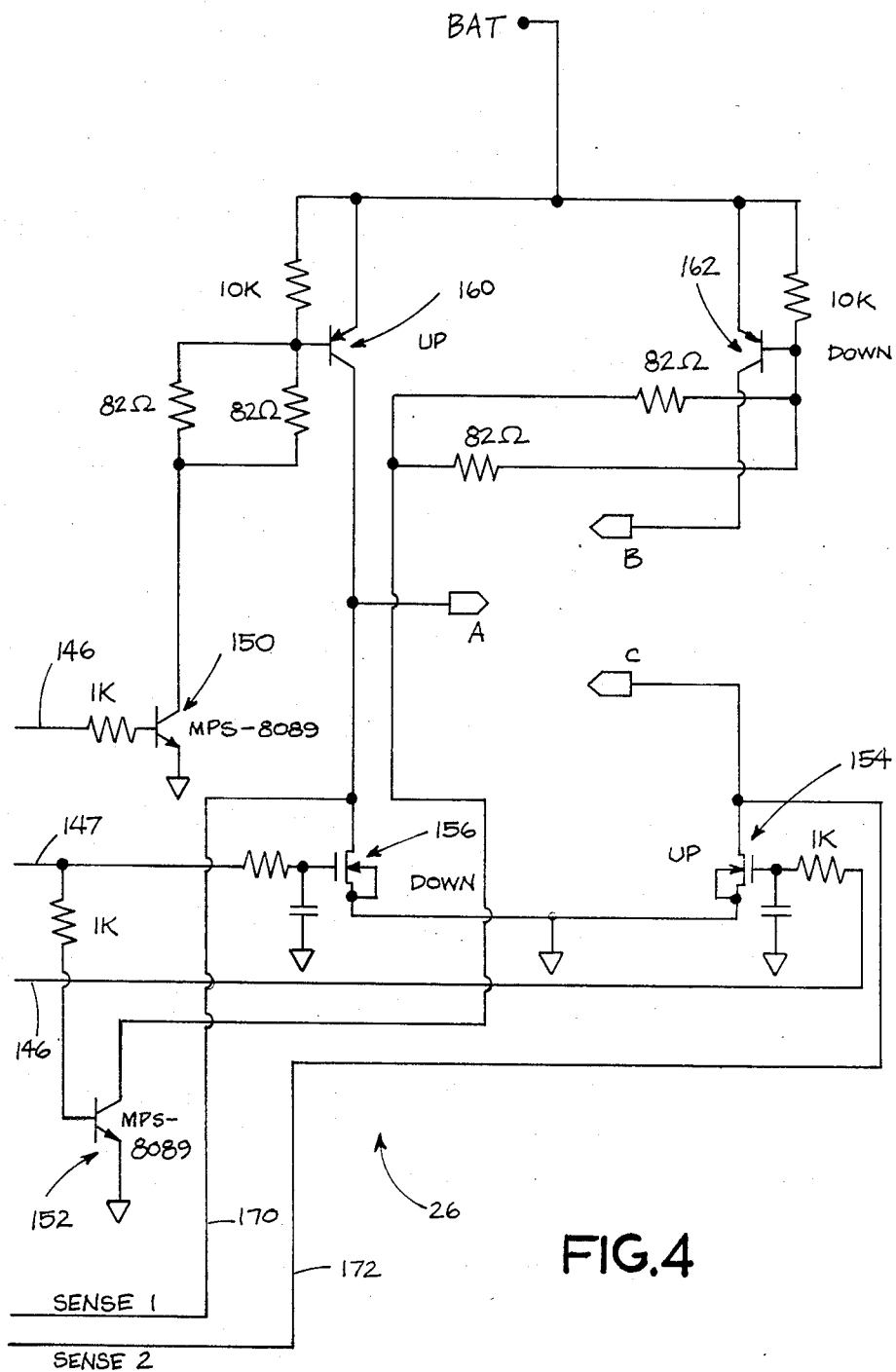
FIG. 4 is a drive circuit for energizing an antenna motor.

An output from pin 6 on the timer 136 is coupled to the same NOR gate 122 as the over-voltage condition signal. Receipt of this signal at the input 122b causes the gate 122 to de-activate the drive circuit 26 (FIG. 4). After the 200 millisecond off period, pin 6 goes low and pin 10 goes high for a 200 millisecond interval. This signal is coupled to an 140a of a second NOR gate 140. This signal causes one or the other of two gates 142, 144 to go high.

When pin 10 on the timer 136 goes high at input 140a to the NOR gate 140, the NOR gate 140 produces a low output to a third input 122c on the NOR gate 122. With all three inputs 122a, 122b, 122c low, the NOR gate 122 output goes high. A high signal at an input 141a to an exclusive NOR gate 141 produces a low output to the gates 142, 144. The gates 142, 144 produce outputs on two conductors 146, 147 coupling the logic circuit 24 to the drive circuit 26.

The gate 142 turns on the switching transistor 150 and field effect transistor 154 (FIG. 4) when both inputs 142a, 142b to the gate 142 are low. The gate 144 turns on the switching transistor 152 and field effect transistor 156 when both inputs 144a, 144b to the gate 144 are low.

The status of the gates 142, 144 depends upon the status condition of the control input 130 and the status of the NOR gates 132a, 132b since these gates 132a, 132b generate the inputs 142a, 142b. Depending upon which gate (132a, 132b) is low, one or the other gate 142, 144 goes high and turns on an associated switching transistor and FET.

The two switching transistors 150, 152 in turn generate control inputs at the base of two power transistors 160, 162. A negative signal at the base input to these transistors 160, 162 turns on the transistor and causes the antenna to be powered in either an up or down direction. The particular transistor configuration is such that when transistors 160, 154 conduct, the antenna is driven up and when the transistors 162, 156 conduct, the antenna is driven down. The fact that current through the motor 14 reverses in these alternate energization states is apparent, by referring to FIG. 5 where the motor connections to the three terminals A, B, C of the drive circuit 26 are depicted.

Two feed-back signals are generated in response to the load current. When one FET transistor 154 receives a gating signal at its input 146 it is driven into conduction. The voltage across the FET transistor 154 is fed back via a conductor 172 as an input 172b to a threshold sensor 174 (FIG. 3) made up of four operational amplifiers 176, 177, 178, 179. A second FET transistor 156 is driven into conduction by a gating signal at its input 147. The voltage across the FET 156 is fed back via a conductor 170 as an input 174a to the threshold sensor 174. The amplifiers 176, 177, 178, 179 monitor the voltage inputs 174a, 174b and compare these inputs to reference inputs 176r, 177r, 178r, 179r generated by voltage dividers having resistor's R1-R4. The amplifiers 176-179 thereby monitor the voltage across each FET generated by the load current through that FET.

If an appropriate response is not sensed within the 200 milliseconds that pin 10 on the timer 136 is high, the threshold sensor 174 deactivates the gates 142, 144. By way of illustration, the two amplifiers 176, 177 monitor the voltage input 174a across the FET 156 that is energized to drive the antenna down. For 200 milliseconds the input 140a (FIG. 3) to the gate 140 is high. If during this 200 millisecond period a second input 140b does not go high, the gate 140 will go high and deactivate the gates 142, 144 when the timer 136 times out.

If the signal 174a reaches a voltage within the window defined by the amplifiers 176, 177 (indicating the drivers have responded to the output from timer pin 10) an output 176a from the amplifier 176 that defines an upper limit will be high and the output 177a from the amplifier 177 that defines the lower limit will be low. This status insures all three inputs 180a, 180b, 180c to a NOR gate 180 are low, the input 140b is high and therefore the gate 140 produces a low output. In a similar manner when the antenna is driven up by the transistors 154, 160 the amplifiers 178, 179 define a window for the input 174b. If the input 174b is within the window the output from the amplifier 179 will be high and the output from the amplifier 178 will be low, again forcing the gate 180 high. In a preferred embodiment a lower voltage limit for the window is 70 millivolts and an upper limit is set at approximately 0.5 volts.

Figure 5:
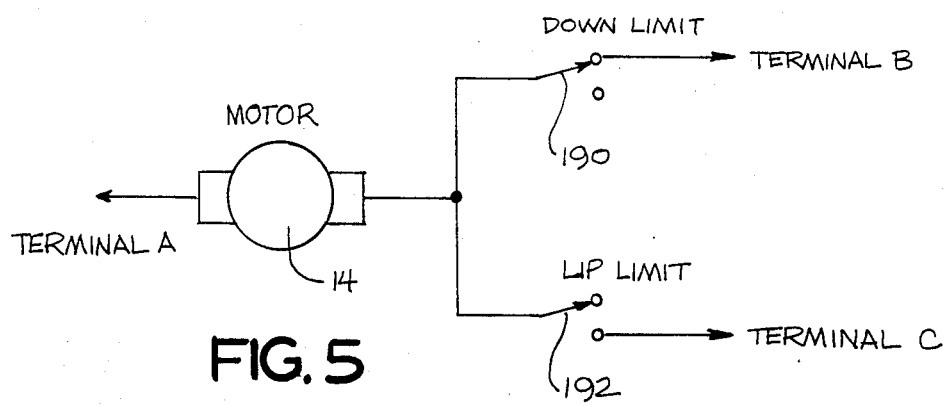
FIG. 5 illustrates a D.C. motor configuration for extending and retracting the motor vehicle antenna.

Motor energization is stopped in response to a change in the voltage across the FETs. As seen in FIG. 5, limit switches 190, 192 open to signify an end of travel. One switch 190 signals an end of downward travel and a second switch 192 signals an end of upward travel.

Opening of a limit switch carrying motor current immediately de-energizes the motor 14 and also results in a drop in the voltage across the conducting FET which de-activates the drive circuit by means of a low output from the gate 180. With one limit switch open the drive circuit will only respond to user inputs that reverse the direction of antenna movement to close the open limit switch.

Operation

Normal operation of the system 10 is now summarized. If the control input 130 is switched to high (to raise the antenna) the delay circuit 132 insures the input is valid, not merely noise or contact bounce. After this delay (Approximately 50 milliseconds) the timer 136 disables the drive circuit 26 for 200 milliseconds by disabling the gate 122. This disables the drive circuit 26 whether it is driving the motor or not.

The timer 136 next enables the gate 140 for 200 milliseconds. The inputs 122a, 122b, 122c are low and the drive circuit transistors 150, 154, 160 turn on to drive the motor 14. This is confirmed by the input 174b to the sensing circuit 174. Receipt of feedback confirmation of drive circuit operation enables the gate 140 after the timer 136 times out the second 200 millisecond interval.

Abnornal Operation

Suppose the input 130 switches from low to high, but that by the end of the second 200 millisecond delay an appropriate voltage is not sensed at the input 174b. Both inputs 140a, 140b to the gate 140 are low and the gate 122 de-activates the drive circuit 26. To raise the antenna after this deactivation the input 130 must be toggled low and then high again.

If the drive circuit 26 begins operation normally but the voltage across a conducting FET varies from the normal operating voltage the drive is also de-activated. To reinstitute antenna movement the input 130 must be toggled back and forth to again initiate drive circuit operation.

Although a discrete component version of the timing, sensing and logic circuits has been disclosed, it is contemplated that these functions will be accomplished using a single integrated circuit. Thus, while a preferred system has been described with a degree of particularity, it is the intent that the invention include all modifications and alterations from the disclosed design falling within the spirit or scope of the appended claims.

We claim:

1. An antenna drive system comprising:
    power means including a bi-directional drive motor coupled to an antenna to extend and retract said antenna;
    actuator means for controlling the status of the power means, said actuator means having an input to generate a two state condition signal for extending and for retracting said antenna;
    timing means responsive to the actuator means for disabling a response of the power means to a change in state of the actuator means for a first time period to avoid rapid switching in the direction the motor moves the antenna and for enabling said power means for a second time period subsequent to said first time period;
    monitoring means to monitor the status of the power means and deactivate the power means in the event the power means does not produce a motor response appropriate for the status of the actuator means; and
    logic means coupled to outputs from the timing, actuator, and monitoring means to activate said power means.

2. The control system of claim 1 where the power means comprises a transistor energization circuit and the monitoring means comprises a sensing circuit to monitor energization current applied to the motor and to compare the sensed current with a reference value.

3. The drive system of claim 1 where the logic means comprises a logic gate that de-activates two additional logic gates, one of said additional gates coupled to said power means to extend said antenna and a second of said two additional gates coupled to said power means to retract said antenna.

4. A method for extending and retracting an antenna by energizing a drive motor comprising the steps of:
    generating a first control signal for extending and a second control signal for retracting the antenna;
    delaying the enrgization of said motor a first predetermined time subsequent to a change of state in the control signal to avoid rapid reversal of drive motor energization;
    energizing said motor for a second predetermined time after said first predetermined time to extend or to retract the antenna; and
    monitoring a motor drive circuit response during said second predetermined time and de-activating said drive circuit if the motor is not properly responding to said energizing step until a different one of said first and second control signals is generated.

5. The method of claim 4 where the monitoring step is performed by sensing drive motor current.

6. The method of claim 5 where the drive circuit is determined to be properly responding if a drive motor current amplitude sensed in the montoring step falls within a predetermined range.

7. A drive system for extending and retracting a motor vehicle antenna comprising:
    a reversible direct current motor coupled to the antenna;
    a drive circuit for energizing the motor in a first sense to extend the antenna and for energizing the motor in an opposite sense to retract the antenna, said drive circuit including switching means to control the direction of motor energization;
    an actuator for controlling operation of the switching means; said actuator producing a first control signal to extend the antenna and a second control signal to retract the antenna;
    delay means interposed between the switching means of said drive circuit and the actuator to delay response of the switching means to a change in state of the actuator for a first predetermined period to avoid rapid reversals of drive current through the motor; and
    monitoring means for monitoring drive current through the motor and de-activating the drive circuit if said drive current is inappropriate for the status of the actuator;
    said drive circuit including gate means coupled to said actuator for reactivating the drive circuit if and only if said actuator is toggled to produce a different one of said first and second control signals subsequent to the deactivating of the drive circuit by said monitoring means.

8. The system of claim 7 additionally including input means to delay the beginning of the first predetermined period to avoid drive circuit response to spurious input signals.

* * * * *